(12) United States Patent
Miklos

(10) Patent No.: US 7,850,850 B2
(45) Date of Patent: Dec. 14, 2010

(54) APPARATUS AND METHODS FOR CONTROL OF WASTE TREATMENT PROCESSES

(76) Inventor: Daniel Robert Miklos, 7525 Doe View Dr., West Chester, OH (US) 45069

( * ) Notice: Subject to any disclaimer, the term of this patent is extended or adjusted under 35 U.S.C. 154(b) by 128 days.

(21) Appl. No.: 11/213,235

(22) Filed: Aug. 26, 2005

(65) Prior Publication Data

US 2005/0279705 A1 Dec. 22, 2005

Related U.S. Application Data

(63) Continuation-in-part of application No. 10/985,265, filed on Nov. 10, 2004, now Pat. No. 7,105,091, which is a continuation of application No. 10/658,575, filed on Sep. 9, 2003, now Pat. No. 6,833,074, which is a continuation of application No. 09/798,313, filed on Mar. 2, 2001, now Pat. No. 6,660,163.

(51) Int. Cl.
*C02F 3/30* (2006.01)
(52) U.S. Cl. .................. 210/605; 210/614; 210/621; 210/630
(58) Field of Classification Search ............... 210/605, 210/614, 621–623, 629, 630, 903, 906, 908
See application file for complete search history.

(56) References Cited

U.S. PATENT DOCUMENTS

| 4,042,493 | A | * | 8/1977 | Matsch et al. ............... 210/625 |
|---|---|---|---|---|
| 4,135,976 | A | * | 1/1979 | Kitajima ....................... 75/713 |
| 4,141,822 | A | * | 2/1979 | Levin et al. ................... 210/625 |
| 4,183,808 | A | | 1/1980 | Dmevich |
| 4,183,809 | A | | 1/1980 | Klapwijk |
| 4,655,925 | A | * | 4/1987 | Tabata et al. ................ 210/605 |
| 4,994,391 | A | * | 2/1991 | Hoffmann ................... 435/292.1 |
| 5,022,993 | A | | 6/1991 | Williamson |

(Continued)

FOREIGN PATENT DOCUMENTS

EP 0106043 4/1984

(Continued)

OTHER PUBLICATIONS

Metcalf & Eddy, Inc., Wastewater Engineering, McGraw-Hill, 1979.

(Continued)

*Primary Examiner*—Fred Prince
(74) *Attorney, Agent, or Firm*—Goodwin Procter LLP

(57) ABSTRACT

Waste-treatment processes are enhanced through generation and introduction of specific biological populations customized to perform or favor specific tasks either during the main process, for the formation or precipitation of certain biological nutrients, or to accomplish solids formation reduction in a post-treatment process. These bacteria may be grown from specialized mixes of activated sludge and waste influent by exposing these materials to controlled environments (e.g., in an off-line treatment area). They may then be returned to the main process to perform certain tasks such as converting particulate cBOD into soluble cBOD for utilization, to reduce high solids yield organisms by supplementing the population with low yield organisms, to provide biological nutrients or oxygenation assistance, to improve nitrification/denitrification efficiency, or to disfavor filamentous biology such as *Norcardia* sp.

11 Claims, 3 Drawing Sheets

U.S. PATENT DOCUMENTS

| | | | | |
|---|---|---|---|---|
| 5,252,214 | A | * | 10/1993 | Lorenz et al. ............... 210/605 |
| 5,288,405 | A | | 2/1994 | Lamb, III |
| 5,304,308 | A | * | 4/1994 | Tsumura et al. ............ 210/614 |
| 5,342,523 | A | * | 8/1994 | Kuwashima ................ 210/605 |
| 5,393,427 | A | | 2/1995 | Barnard |
| 5,514,277 | A | | 5/1996 | Khudenko |
| 5,514,278 | A | | 5/1996 | Khudenko |
| 5,601,719 | A | * | 2/1997 | Hawkins et al. ............ 210/605 |
| 5,616,241 | A | | 4/1997 | Khudenko |
| 5,705,072 | A | * | 1/1998 | Haase ......................... 210/605 |
| 5,736,047 | A | * | 4/1998 | Ngo ............................ 210/602 |
| 5,798,043 | A | | 8/1998 | Khudenko |
| 5,846,424 | A | | 12/1998 | Khudenko |
| 5,989,428 | A | * | 11/1999 | Goronszy .................... 210/605 |
| 6,004,456 | A | | 12/1999 | Khudenko |
| 6,015,496 | A | * | 1/2000 | Khudenko ................. 210/603 |
| 6,048,459 | A | | 4/2000 | Khudenko |
| 6,077,430 | A | * | 6/2000 | Chudoba et al. ............ 210/605 |
| 6,093,322 | A | * | 7/2000 | Bongards .................... 210/614 |
| 6,174,433 | B1 | * | 1/2001 | Futami .................... 210/195.3 |
| 6,616,843 | B1 | * | 9/2003 | Behmann et al. ........... 210/605 |
| 6,783,679 | B1 | | 8/2004 | Rozich |
| 7,387,723 | B2 | * | 6/2008 | Jordan ......................... 210/220 |
| 2006/0000768 | A1 | * | 1/2006 | Miklos ....................... 210/605 |
| 2006/0201876 | A1 | | 9/2006 | Jordan |
| 2007/0000836 | A1 | | 1/2007 | Elefritz, Jr. et al. |
| 2007/0051677 | A1 | | 3/2007 | Curtis et al. |

FOREIGN PATENT DOCUMENTS

| | | | |
|---|---|---|---|
| EP | 1 236 686 A1 | | 4/2002 |
| EP | 1 236 686 A1 | | 9/2002 |
| JP | 56-78691 A | * | 6/1981 |
| JP | 62-38293 | | 2/1987 |
| JP | 3-76998 | | 12/1991 |
| JP | 4-197497 A | * | 7/1992 |
| JP | 5-66199 | | 3/1993 |
| JP | 8-39096 | | 2/1996 |
| JP | 11-57762 | | 3/1999 |
| JP | 2001-29992 | | 2/2001 |
| KR | 2001-010216 | * | 2/2001 |
| WO | WO 94/24056 | | 10/1994 |

OTHER PUBLICATIONS

J. Charpentier, et al., "Oxidation—Reduction Potential . . . ", Water Science Technology, vol. 21, 1988.

Florida Rural Water Association (FRWA), "Nitrogen Control in Small Wastewater Plants", Website.

J. Malina and F. Pohland, Design of Anaerobic Processes, Technomic Publishing Company, 1992.

J. Sheridan and B. A. Curtis, "Revolutionary Technology Cuts Biosolids Production and Costs", Pollution Engineering, May 2004.

Non-Final Office Action for Reexamination Request Control No. 95/000,237, issued May 7, 2007.

Response to Non-Final Office Action for Reexamination Request Control No. 95/000,237, filed Jul. 6, 2007.

Office Action issued by Japanese Patent Office for Application No. JP2002-56,823 on Jun. 17, 2008.

Examination Report issued by European Patent Office for EP02251108.3 on Feb. 20, 2008.

* cited by examiner

APPARATUS AND METHODS FOR CONTROL OF WASTE TREATMENT PROCESSES

RELATED APPLICATIONS

This application is a continuation-in-part of U.S. Ser. No. 10/985,265, filed on Nov. 10, 2004 (now U.S. Pat. No. 7,105,091), which is a continuation of U.S. Ser. No. 10/658,575, filed on Sep. 9, 2003 (now U.S. Pat. No. 6,833,074), which is a continuation of U.S. Ser. No. 09/798,313, filed on Mar. 2, 2001 (now U.S. Pat. No. 6,660,163). The entire disclosures of these applications are incorporated herein by reference.

BACKGROUND OF THE INVENTION

1. Field of the Invention

The present invention relates to biological treatment of contaminated liquids and effluent, and, more particularly, to methods and apparatus for the creation and/or application of customized biology populations to biological processes, such as wastewater treatment.

2. Description of the Related Art

Before being discharged to the environment, contaminated waters from municipal, commercial, and industrial sources frequently must be treated to prevent harmful impacts. The treatment processes used are numerous and varied. A rudimentary conventional process is shown in FIG. 1. The treatment process often begins with a coarse removal step 110, in which the waste influent is typically treated by screening and grit removal processes. In some treatment processes, the coarse removal step 110 is followed by a surge tank or lagoon, sometimes known as an equalization tank or a flow equalization vessel (not shown), to provide hydraulic inventory and reduce flow surges through the treatment process. The coarse removal step 110 can be then followed by the removal of sludge and solids in a primary clarifier 112. Frequently the sludge from the primary clarifier 112 is partially consumed in a digester 114, which recycles clear effluent back to the start of the process and diverts the unconsumed sludge to disposal.

In some processes the clear effluent overflow from the primary clarifier 112 is stored in a flow equalization vessel (not shown). Such a vessel is used to provide inventory and to reduce flow surges through the treatment process. This clear effluent overflow from the clarifier may be mixed with activated sludge and aerated in an aeration unit 118 before being fed to a secondary clarifier 120 for secondary treatment. In some processes the aeration unit 118 has insufficient capacity to provide sufficient oxygen to meet the biological metabolism requirements of the microorganisms present in the waste stream. Such processes would benefit from additional oxygenation capacity.

The clear effluent overflowing the secondary clarifier 120 may be disinfected by a disinfecting unit 122, which may apply, for example, chlorine or UV light, and discharged to a local waterway as effluent. The solids from the secondary clarifier 120 are generally thickened, e.g., by a filter press 124 and then sent off for disposal.

Biological processes are commonly used for the elimination of contaminants in the secondary treatment portion of the process, and may take many forms. They generally involve exposure of the waste stream to one or more forms of microorganisms that stabilize or digest various contaminants. The microorganisms to be favored by the particular treatment process implemented are chosen to complement the waste stream in terms of content, strength, the biochemical and chemical environment used for treatment, and the specific effluent requirements. For example, the activated sludge process utilizes aerobic bacteria that remove the soluble biological oxygen demand (BOD) from wastewater. Practice of this process generally involves conducting wastewater into an aeration basin containing a suspension of digestive microorganisms, thereby forming a "mixed liquor" that is aerated to furnish oxygen for consumption of the BOD, the formation of new biomass, and the respiration of biomass maintained in inventory; the biomass sorbs, assimilates and metabolizes the BOD of the wastewater. After a suitable period of aeration, the mixed liquor is introduced into the secondary clarifier, in which the biomass settles, allowing the treated wastewater to overflow into an outlet effluent stream. All or a portion of the biomass separated from the effluent in 120 is returned to 118 to treat additional influent.

The BOD provided by the waste acts as "food" for the microorganisms. The BOD may be measured and reported as total BOD that includes both nitrogenous (NBOD) and carbonaceous oxygen demand (cBOD) or separately as NBOD and cBOD. This BOD, especially the cBOD, may be present in particulate or soluble form. The propensity of a given organism to metabolize a particular form of NBOD or cBOD and the rate at which this is done are determined by both the local environmental conditions and the number of organisms of similar type. In addition to carbonaceous "food," microorganisms require certain macronutrients for survival, such as sodium, calcium, phosphorus, and/or nitrogen, and trace levels of micronutrients such as iron, sulfur, and/or manganese.

Controlled and efficient inclusion and removal of these macro and micronutrients with the waste stream are managed within the treatment process, and may be an important component of its operation with respect to meeting local effluent disposal requirements. Indeed, nutrients required for efficient operation of the treatment process may also contribute to environmental discharge concerns. For example, although certain microorganisms require phosphorus to survive, an excess of phosphorus in the treated waste stream can mandate addition of chemicals to precipitate and then coagulate and flocculate these materials to promote their separation and settling from the effluent to be discharged, whereupon the resulting sludge is commonly disposed of in a landfill.

As these various materials are metabolized by the microorganisms they may reproduce, and the degradable portions of the influent are converted into gases and excess biology. The excess biology may consist of live and/or expired microorganisms and other organic materials, and will generally be disposed of as sludge at the terminal portion of the process. The clear effluent that remains is generally discharged to a local receiving water body.

The microorganisms selected for the elimination of the contaminants in the incoming waste stream may come from many sources. Most waste treatment processes treat their incoming waste with recycled biology populations obtained from a downstream portion of the process. Recycling of these microorganisms is convenient and inexpensive, but unfortunately does not readily lend itself to the customized matching or tailoring of a given biological population to the varying needs of the influent waste stream. The composition, effectiveness, and amounts of the various recycled populations of microorganisms are also affected by the feed composition present when they were generated, so they are especially impacted by changes in the flow compositions or influent concentrations. These problems are exacerbated by the limited amount of flexibility most treatment plants have in manipulating the factors that favor a desired biological population profile. The options frequently are limited to the wasting of a portion of the sludge or some of its associated water chemistry, in an attempt to drive the biological selection process to a particular population balance by controlling the average "age" of the population, balancing the slower growing, more efficient organisms with the faster growing, more responsive organisms.

Partially in response to this need for varied populations, in response to local effluent requirements, and in an effort to accelerate the treatment process, a waste treatment plant may treat the waste stream with a combination of biological environments generally within the secondary treatment portion of the process. While virtually all treatment schemes utilize several major classes of bacteria, including obligate aerobes, facultative aerobes, nitrifiers, obligate anaerobes, and facultative anaerobes, manipulation of the different environments within the particular scheme favor different classes of bacteria that compete with each other in the course of the treatment process. The results of this competition affect the efficiency of the treatment process and the degree of treatment achieved in the final effluent.

Common to all of these processes, however, is generation of a waste stream of excess biology, generated because new growth exceeds death and decay. In most instances that waste stream also will contain particulate, seemingly non-degradable organic and inorganic material, in addition to the excess biology. Usually, the waste stream is removed as a portion of a solids recycle stream and it is directed to a terminal solids treatment process, thus minimizing the volume of excess waste solids that must be disposed of. The terminal treatment process functions primarily to concentrate and stabilize these materials for disposal and may include further biological treatment ("digestion") that specifically enhances general death and decay of biomass.

Both as described and as generally practiced, the current waste treatment processes exhibit significant limitations. Conventional modes of operation do not allow microorganism populations to be tailored to the characteristics of a particular waste stream, which may change over time. Moreover, increasing the rate and extent of such biological processes would be desirable. Although minimizing the quantity of disposable solids is important to the performance of waste treatment systems, the ability to achieve low solids levels is impeded by the problems of excess biology and limited digestion, resulting in excessive operating costs, disposal costs, and potentially adverse environmental impacts.

SUMMARY OF THE INVENTION

The preceding problems are addressed by the generation and introduction of specific biology populations with modified characteristics in stored substances, such as macro nutrients and carbon-based compounds, and which are customized to optimize waste treatment process by performing specific tasks during the main treatment processes while maintaining minimal solids growth. These bacteria may be grown from specialized mixes of activated sludge and waste influent by exposing these materials to controlled growing environments, e.g., in an isolated off-line treatment area. The off-line environment is also controlled to selectively stress the population developed in the on-line treatment process that does not have the desired characteristics of low growth or yield. The resulting modified population may be added back to the main process to optimize further treatment of the waste stream by performing such tasks as improving nitrification/denitrification efficiency, or achieving target levels of desirable biological make-up, such as, for example, increasing the population of facultative anaerobic bacteria (also referred to as anaerobes) while minimizing sludge yield. To achieve its objectives, the invention relies upon on-line measurements of oxidation reduction potential ("ORP") and pH while also monitoring and controlling release and generation of ammonia, nitrate, and phosphorus.

Generally, in one aspect, the invention provides for the treatment of a waste stream using a growth method that involves conducting a portion of the waste stream to a first treatment vessel and contacting it with a first biological population having a first population profile. The method further involves drawing off a portion of thusly-treated waste stream to an off-line treatment vessel and isolating it. The drawn-off portion is controlled in the off-line treatment vessel to establish a second biological population having a second population profile that is different from the first population profile. The controlling step includes monitoring levels of at least one of ORP and pH, and monitoring the level(s) of at least one of ammonia, phosphorus, and nitrate to optimize further treatment of the waste stream while minimizing sludge yield, e.g. to achieve a target level of a desired biological make-up, such as facultative anaerobic bacteria. The controlling step, responsive to the monitored content levels, may include allowing an ORP level to decrease, causing the content of ammonia and/or phosphorus in the drawn-off portion to increase (e.g. by causing release of at least one of ammonia and phosphorus from biological destruction and external biological substance solubilization) until a desired content value is achieved.

Further, the invention is directed to enhancing the rate and extent of growth-based processes for treating a waste stream. In various embodiments, the generated biological populations can be customized to consume the generated solids residue in order to reduce the overall disposal volumes and costs. Thus, in another aspect, the invention provides for the treatment of a waste stream using a growth method that involves conducting a portion of the waste stream to a first treatment vessel and contacting it with a first biological population having a first population profile, drawing off a portion of the thusly-treated waste stream to an off-line treatment vessel, and isolating it. The drawn-off portion is controlled in the off-line treatment vessel to establish a second biological population having a second population profile that is different from the first population profile. The controlling step includes sequentially subjecting the drawn-off portion to aerobic followed by anaerobic or anoxic conditions, for example, subjecting the draw-off portion to at least one accelerated cycle of achieving a high aeration intensity level followed by reducing oxygen levels to anaerobic or anoxic conditions in the waste stream in the first treatment vessel, i.e. in the main treatment process.

Various embodiments of the inventive methods result in both the main treatment process and the off-line process are enhanced with reduced sludge yield and improved sludge quality, i.e. settling, because in the sequential aeration scheme contemplated by the invention, the aerobic process component is an extension of the anaerobic process component, and vice versa.

Oxygen levels for both aerobic and anaerobic/anoxic conditions are generally comparable to varying oxygen levels of the waste stream in the main treatment process. Unlike conventional aeration techniques, in various embodiments of the invention, high intensity aeration level is achieved by delivering oxygen over an area of a limited size, for example, in a single location.

This aerobic aeration intensity can include maintaining an ORP level above a targeted value for a selected period of time, or provide a dissolved oxygen level above about 1 mg/L for a selected period of time. The method can also include the step of subjecting the drawn-off portion to anaerobic conditions.

Embodiments of the invention include accelerating the treatment process by, for example, reducing oxygen levels by providing an external carbon source to drive a loss of oxidation pressure. For example, both the main treatment process and sequencing between aerobic and anoxic/anaerobic conditions can be accelerated by the addition of a raw influent as a carbon source. In many embodiments, the first biological population is further modified and enhanced in the off-line process where a reduced carbon source requires longer duration of sequences to achieve anoxic and/or anaerobic conditions. The external carbon source can include a raw influent, an unstable mixed liquor from the main treatment process, and/or a commercially available carbon source, such as, for example, methanol. The anoxic conditions can include achieving the ORP level below a targeted value, such as, for example, below 50 mV, or, in some embodiments, about 0 mV. Generally, the ORP level is site- and process-dependent based on the available organic demand and local water chemistry.

In various embodiments of the invention, there is no flow of population between the off-line treatment vessel and first treatment vessel during the controlling step. Settling can be used during the controlling step to produce a decantable volume containing a reduced volume of solids. A fraction of the drawn-off portion including a portion of the second biological population can be taken from the off-line treatment vessel and returned to the first treatment vessel.

Embodiments of the invention provide for the treatment of a waste stream using growth methods that involve mixing a portion of the stream with activated sludge and then using controlled mixing, air exposure, residence time, and settling sequences to create specialized population profiles. These specialized biological population profiles have characteristics that are useful for achieving particular desired results when treating the incoming waste, oftentimes in combination with (or as a pre-existing component of) the main treatment process.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
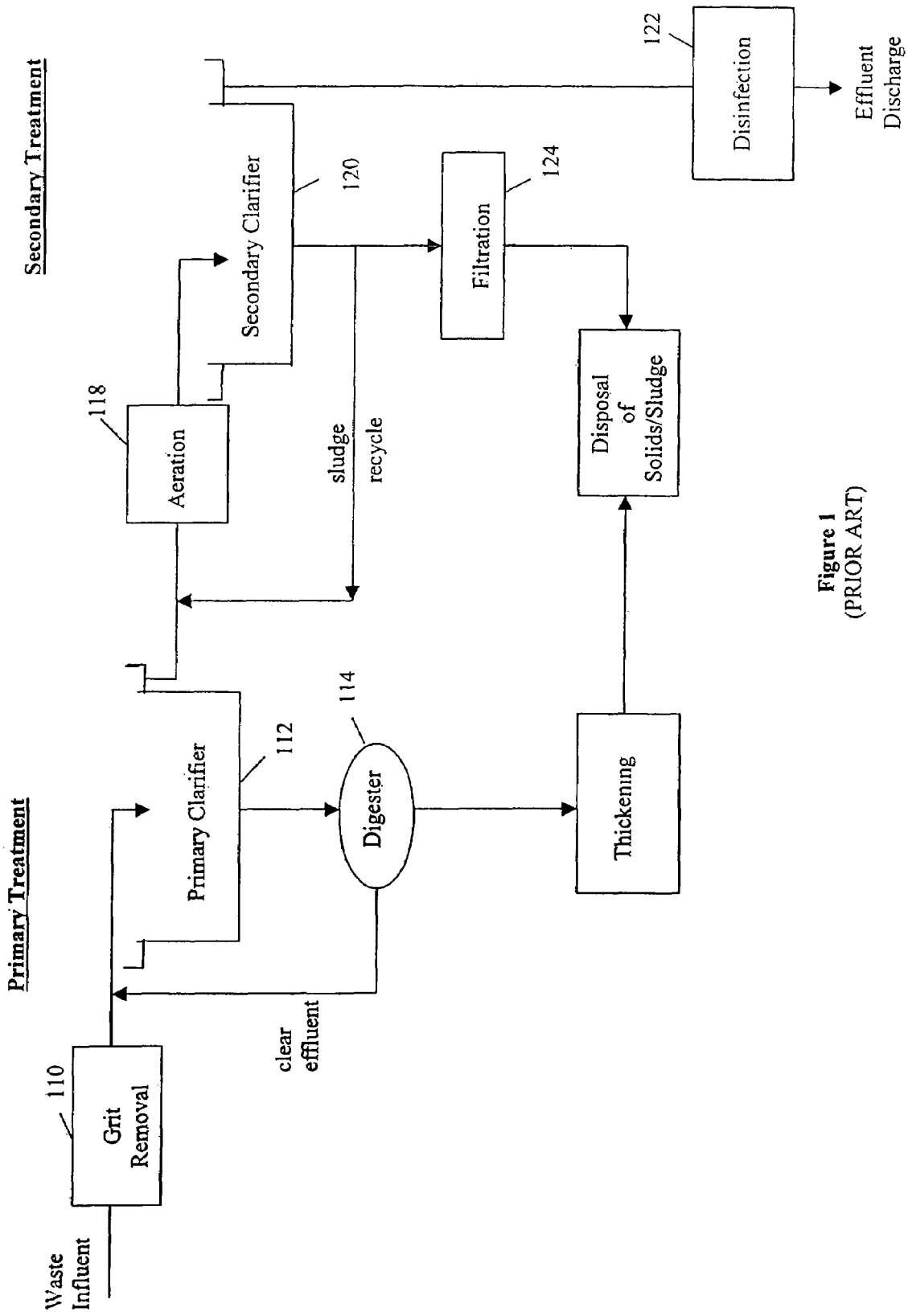
FIG. 1 shows a waste treatment process, representing a basic flow sequence that is well-known in the art and to which the present invention may be applied.

The bacteriological populations used to treat wastewater and its residuals may be adjusted and controlled by the off-line manipulation of both an aerobic stress/destruction and a growth environment. Such a growth environment may be conveniently established in equipment that is not regularly used within an existing waste treatment process. For example, an aerobic digester previously used as a terminal solids handling device may be used as an extension of the wet stream treatment process in one or more embodiments of the present invention.

By these means conditions may be generated that favor low solids-yield microorganisms, high removal-efficiency microorganisms, provide high or low load return material for the main treatment process, minimize the formation of filamentous biology, and/or provide for the consumption of residual sludge (to minimize its volume). These and other biological classes may be formed by the methods and apparatus disclosed below. These may also be used to provide enhanced quantities of desirable nutrients, additional oxygenation capacity, increased conversion of particulate carbon to solubilized cBOD, and reductions in disposal volume for certain nutrients.

One way to quantify the operating characteristics of a water or wastewater treatment facility is by ORP, the techniques of which are familiar to those skilled in the art. As seen in Table 1, growth of filamentous *Norcardia* sp. is especially favored in an ORP range of about −50 to +50 mV which range is also typified by low dissolved oxygen content (microaerobic) concurrent with low amounts of soluble cBOD. These preferred conditions for growth and replication of *Norcardia* sp. result in their enhanced population which gives unfavorable settling and higher yield characteristics to the overall biological population and suspended solids of the main treatment process. Hence, waste treatment plant operation is hindered by maintaining conditions in this microaerophilic range that may be necessitated by high plant throughput rates.

TABLE 1

| Region | ORP Range (mV) | Example Biology |
| --- | --- | --- |
| Obligate anaerobic | <−400 | Methanogens |
| Facultative anaerobic | −400 to −200 | Sulfate reducing bacteria, Acidogens |
| Facultative aerobic | −200 to +150 | *Bacillus* spp., *Pseudomonas* spp, |
| Microaerophilic | −50 to +50 | *Norcardia* sp., Type 1701, *Sphaerotilus natans* |
| Obligate aerobic Condition | +50 to +200 | *Nitrosomonas* and *Nitrobacter* |
| Aerobic | >+50 | |
| Anoxic | −150 to +50 | |
| Anaerobic | <−150 | |

These and other factors may be mitigated by the present invention. For example, a mixture containing certain amounts of waste influent and waste activated sludge may be customized by controlling factors such as solids content, residence time, mixing with air, mixing without air, subsequent addition of influent or sludge, and/or the selective removal of certain fractions of the mixture to achieve certain biological results including the demise of certain biological populations, the enhancement of other, preferred, populations and the modification of the profile in surviving populations different than what is generated during with the on-line process.

The invention may be used in several modes. In the "selector" mode an off-line mixture is customized to provide a particular biological profile for return to the main treatment process that will favor the presence of one or more classes of microorganisms, and disfavor the presence of microorganisms that are adverse to the processing objectives. The desired combination of favorable and unfavorable conditions for growth is obtained in the selector as described herein. When the desired biology is returned to the main treatment process, providing a desired biology population with even a slight population advantage may result in a significant operational enhancement over time, because the competitive balance between the populations will have been shifted.

The invention may also be operated in the "collector" mode, whereby the off-line process is operated as a digester, with the goal of minimizing the yield of solids and collecting these for disposal. Thus, in collector mode, the off-Line mixture is concentrated with or without additional treatment. The combined effect of these two modes of operation is minimizing the quantity of residual solids for ultimate disposal beyond what would normally be possible if a system were operated in a conventional fashion while enhancing the performance of the main process.

Elutriation with raw influent waste is one technique that may be used for the generation of specialized biology populations. Traditionally, elutriation as used in waste treatment processes would be for the purpose of reducing the inorganic content of a specific volume of waste solids by dilution with water of a lesser inorganic content (dissolved or undissolved). In the present invention, elutriation involves exchanging the free water of dilution during the selection process to achieve reduced inorganic content while concurrently increasing the organic content of the volume by adsorption and absorption of cBOD from the raw influent waste. This exchange of reduced inorganic content concurrent with increased cBOD is used to strategically favor the formation of the class of biology desired as those classes capable of capture and retention of "food" will have a competitive advantage for growth and replication. Directly related is the technique of strategic introduction of high strength influent flow in the absence of oxygen (air) supply to a given biological population. Introduction of this material during the mixed/unaerated cycle results in a competitive advantage to those species capable of fixing and retaining cBOD and/or NBOD for subsequent growth and replication. The present invention uses these techniques in off-Line processes for the specific enhancement of biological populations and provides for their use in the mainstream treatment processes by production of such high strength (high CBOD) streams that may be delivered to the main treatment process under conditions of controlled time, amount, and "introduction environment" to the on-Line process. Since the selector process output is returned to the main treatment process, there are no effluent discharge compliance issues that limit how far the process may be pushed, and so the process may be operated to fully maximize the biological results achieved.

Another significant aspect of the invention is the release of carbon, ammonia, and phosphorus in the off-tine treatment vessel. What had been incorporated within the biology in the on-Line treatment vessel is released during the extended off-cycle with low ORP. The extended off-cycle generates carbon and nutrient release under conditions favorable to a low-yield, proper settling population. The subsequent re-incorporation of the solubilized carbon, ammonia, and phosphorus unto the second population with improved settling characteristics for return to the on-line treatment vessel.

Customized biological populations may be generated to achieve specific objectives. Example 1 below teaches how to generate a biological population that converts particulate cBOD into soluble cBOD for utilization. The population of organisms selectively enhanced allows for generation of a high cBOD stream to be returned under controlled conditions and for generation of a biological population that has greater capacity for reduction of particulate to soluble cBOD. This is useful to reduce solids content, or to provide food during periods of low influent BOD content to help sustain the existing population of microorganisms. Example 2 below teaches how to generate low-yield bacteria. Use of these microorganisms results in less residual solids formation, such that disposal quantities and costs are reduced. Additionally, the lower solids content results in energy savings since fewer solids need to be processed and transported through the mainstream processes.

The embodiment of Example 3 teaches how to improve the yield characteristics of the whole while concurrently improving nitrification/denitrification capability and capacity. This invention is particularly useful for facilities that have difficulty meeting their environmental effluent discharge requirements for nitrogen content. Example 4 teaches a method for reducing the formation of filamentous biology. These microorganisms are especially troublesome for plant operation and efficiency in that they do not settle well, do not filter well, and are largely gram positive (a general characteristic of high solids yielding species).

Example 5 teaches a method for the off-line minimization of residual solids content, prior to disposal. Operated as a collector subsequent to operation in selector mode, the method of this example may be employed repetitively until further consumption and denitrification is no longer achieved after the residual solids have been minimized by specific selection techniques embodied in the present invention. Example 6 teaches a method for the reduction or optimization of facultative anaerobes profile while monitoring ammonia, phosphorus, and nitrate levels. The method can be used to generate nitrates, which can be used as an oxygenation source in a treatment process.

The embodiment of Example 7 teaches a method to create phosphate particles of increasing size. Use of this technique in a treatment process allows environmental discharge standards to be met using reduced amounts of flocculent/coagulant. Example 8 teaches a method that uses accelerated cycles of high aeration intensity to degrade biological material external to the microbial population. This technique can be used to enhance the results of Example 2.

Lastly, Example 9 teaches a method to generate a process seed having an increased carbon uptake capacity. The resulting seed mixture can be added to a treatment process to facilitate the treatment of a waste stream.

Figure 2:
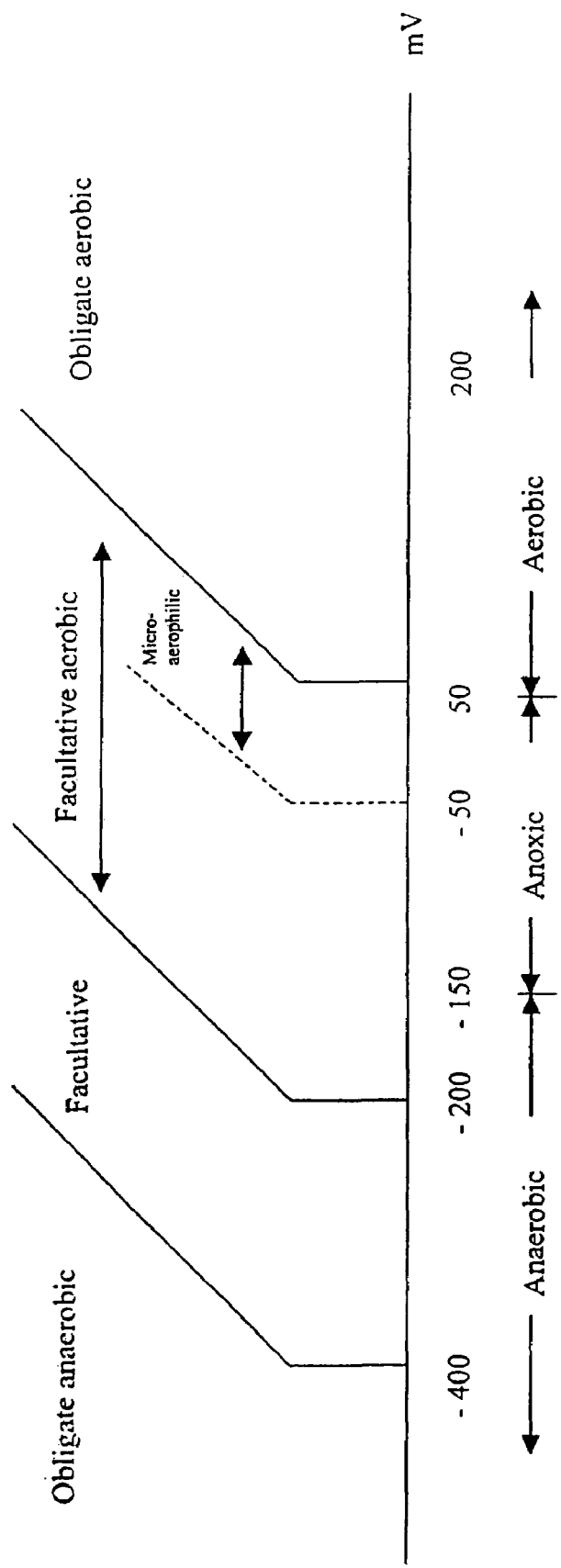
FIG. 2 illustrates the ORP ranges in which different types of biology populations tend to predominate.

As illustrated in FIG. 2 and in Table 1, various types of microorganisms thrive in environments of different ORP ranges. Dissolved oxygen content is not always indicative of ORP. Other methods may be employed to measure which microorganisms are favored, such as Specific Oxygen Uptake Rate (SOUR), Specific Nitrogen Uptake Rate (SNUR), pH, phosphorus, ammonia or nitrate content. The operational control of the sequence of conditions by ORP, SOUR, SNUR, pH, phosphorus, ammonia, or nitrate content, or other description of biological conditions is not intended to be all inclusive, limiting, or otherwise required for the implementation of various embodiments.

Also affecting the biological selectivity is the quantity of biological solids present. As waste treatment plant throughput rates increase generally so also do the volumes of residual sludge produced, requiring increased amounts of solids to be sent out for disposal. Increased plant throughput normally is thereby linked to increased disposal requirements. The fixed volume available for processing the influent mandates that the treated materials spend less time within the confines of the treatment process, including the generated solids. However, some plants have additional solids retention capability, thereby altering the ratio of solids to influent and impacting the inherent biological selectivity. This variation in solids content is not known to be of practical usefulness to those who operate waste treatment plants. Control of the fraction of biological solids, and in particular the overall reduction of its amount as a whole is used to advantage by the biological selection process of the invention.

As mentioned earlier, some waste treatment plants supplement the incoming waste flow with nutrients to support the biological treatment processes. For example, as detailed below, the invention may be used to generate high- or low-load return to the treatment plant. Low-load material is typically high in ORP and may be also high in nitrate content, while high-load material is generally low in ORP and may be high in one or more of soluble cBOD, phosphorus, ammonia, and/or organic nitrogen. This choice may be made during selector operation virtually independent of the selection process, allowing these return materials to be strategically chosen and provided to the main treatment process during the appropriate portion of the diurnal cycle.

Nitrogen, commonly present in the form of ammonia or nitrate, can be considered to be another biological nutrient in treatment processes, and sometimes needs to be added to the incoming waste flow. However, using ammonia and nitrate monitoring in addition to pH and ORP analyses allows the control of the nitrogen reactions to be improved. A drop in ORP can be used to detect ammonia release from the biomass, and conversely, excessive ammonia release corresponds to an ORP drop that will generate significant sulfate reduction. Ammonia release is also affected by time and increased temperature, in the absence of air and mixing. However, monitoring and control of ammonia and nitrate levels can be used to maximize the ammonia release while preventing excessive sulfate reduction and odor generation, such that the biological selection of facultative anaerobic bacteria profile is optimized while the destruction of an aerobic bacteria profile is optimized for subsequent return to the online waste treatment process.

Notably, the on-line treatment process preferably needs to stay sufficiently aerobic to maintain efficient water quality standards that are low in ammonia, phosphorus, and carbon (CBODS) content. These materials are released when the first population profile is stressed with low ORP environment, as found in the off-line reactor disclosed herein. The materials are released to the surrounding water as a function of the initial population profile stress, destruction, and solubilization of external biological substances. The anoxic and anaerobic environment release of this material for re-growth under low ORP/low yield conditions is generally contrary to aerobic treatment release of these materials under high energy and high yield conditions in the on-line process or the terminal process for solids in aerobic digesters. Thus, the selective destruction referenced above occurs because the biomass profile was formerly unavailable for ammonia formation during aerobic processes. After sufficient ammonia generation has occurred, air is added to raise the ORP and to oxidize the generated ammonia, resulting in nitrate formation. Aeration is generally stopped after a predetermined period of time, once an increased ORP set point is reached or the pH lever begins to decrease. The drop in pH indicates a loss of alkalinity from ammonia oxidation. It is also caused by the aeration and treatment of organics that were formed while the ammonia was being released. Techniques such as these can be of benefit, for example, in the following situation.

If the treatment plant is underloaded, a low-ORP, high-load return containing organic and nitrogen oxygen demand may be provided to help feed the microorganisms in the aeration process. Conversely, a high-ORP, low-load return might be preferred for times when the plant requires oxygenation assistance, in which case the high nitrate content also may be used to help sustain the facultative biology with combined oxygen (see, e.g., Example 6). In this manner the filamentous microaerophiles are stressed by a reduction in available food and improved free oxygen levels, helping to reduce the organic demand and allowing the aeration process to have sufficient aeration capacity during otherwise high loading periods to attain high ORP conditions in the mainstream process, further discouraging filamentous organisms.

The technique is especially useful for plants that have excessive organic loading and cannot aerate their way beyond or above the preferred filamentous formation range.

The combined oxygen contained in the nitrates allows BODs uptake by the facultative anaerobes and reduces the BODs oxidation that must occur with limited free oxygen. The high ORP nitrate return can be used to provide for combined oxygen introduction to immediately start removing BOD/cBOD. (To prevent filament formation, it would be necessary to operate without marginal residual oxygen until the BOD is removed by adsorption, absorption, or conversion to gases, then aerate to ORP levels above the preferred filament formation range.) Without use of the present invention, the steps required to avoid preferential conditions for filamentous organisms would limit the throughput capacity of the treatment plant. The situation is exacerbated at high food-to-microorganism (F/M) ratios, where an ever-increasing amount of dissolved oxygen is required to prevent the formation of filamentous biology.

However, for situations such as these where the aeration system of the main process flow is unable to provide adequate oxygenation to avoid excessive filamentous growth, then the high-nitrate source generated by the invention may be used to supplement the oxygen supply. In this manner the nitrate source may be used during times of peak influent flows to supplement the aeration process, thereby preventing the microaerophiles (filamentous biology) from taking advantage of the low dissolved oxygen conditions. Proper sequencing of the selector operation may thereby be provided to match selector return with the peak demand requirements of the main treatment process. Further benefits may be obtained concurrently by off-line selection against filamentous organisms and/or by selection of biological populations that are both more efficient in their use of oxygen (facultative aerobes) and/or by selection and preferential cultivation of populations that do not require oxygen sources for conversion of cBOD to gases.

Another embodiment of the invention, still operating in selector mode, facilitates minimizing the solids volume a waste treatment plant must send out for disposal. Off-line operating conditions are selected which enhance the population of low-yield organism profile to the equilibrium point where the death and decay of the organisms is offset by the lower yield generation (i.e., the increase in biological solids is balanced by the reduction in overall solids yield), or by operation of the process to accelerate the decay sufficiently to achieve that same equilibrium. This may be achieved by decreasing the ORP to <−150 mV, or preferably to <−200 mV and lower then increasing the ORP to >50 mV, or preferably to >100 mV and higher. The ORP ranges are dependent on site conditions and may vary from plant to plant. The resulting biological population may then be used to augment the solids of the main process flow resulting in minimization of the solids generated initially and concurrently helping the effluent to comply with discharge water quality requirements.

Elements of the same method may be used to advantage in the collector mode of operation, when a limited amount of non-degradable content is present. This method is detailed in Example 5 below. Operation of the terminal treatment/stabilization process serves to minimize the overall amount of material that must be disposed of by a waste treatment plant. By this method residual solids are converted to solubilized biomass and returned to the main treatment process for consumption. In collector mode, the residual non-solubilized materials are disposed of after maximizing the solids content to achieve minimum solids volume for subsequent processing. The proportional frequency of operating in "selector" mode versus the terminal "collector" mode is determined by the amount of non-degradable content of the influent material to be treated. The number of cycles performed by the collector to concentrate and maximize a given mass of material is limited primarily by the ratio of biological solids to non-degradable materials and by the relative amount of non-degradable content originally present.

Another, albeit indirect, method to reduce solids disposal volumes relates to phosphorus control. Phosphorus is a biological nutrient that can be present in waste treatment streams in amounts greater than allowed by environmental discharge regulations. Chemical additives such as flocculating and coagulating agents are commonly added to solutions containing soluble phosphorus (sometimes in the form of orthophosphate), causing the phosphorous particles to precipitate and those particles to floc together out of solution. The addition of these chemical agents for this purpose results in increased sludge disposal volumes, not only because of the resulting phosphate precipitant, but also because it is necessary to dispose of these additives. The invention includes methods to precipitate phosphorus without requiring the use of such additives, if the native water chemistry has other naturally occurring compounds available to generate a precipitate under the cycling conditions between low ORP and high ORP disclosed herein.

Phosphorus precipitation can be accomplished as described below, without requiring the use of flocculating or coagulating agents (see, e.g., Example 7). Re-aeration of a previously un-aerated biological mixture can cause incremental precipitation of previously solubilized phosphate, due to a pH increase caused by carbon dioxide stripping during the aeration cycle. Under the low ORP, non-mixed condition, bacterial respiration continues in a micro-environment of low pH due to the excessive carbon dioxide that is not stripped by mixing and aeration. The phosphorus content in the liquid is increased as phosphorus accumulating organisms ("PAOs") incorporate the carbon that has been solubilized with low ORP. The PAOs continue to respire, releasing phosphorus. Also, very small phosphorus compounds that exist as acid-soluble alkalinity are dissolved and continue raising the phosphorus content in the liquid and lowering the phosphorus content in the solids. When mixed and aerated, there is a rapid increase in pH. The common ion effect of high phosphorus reduces compound solubility and there is a precipitation of phosphorus as a chemical precipitate. Smatter seed particles grow into larger particles with Less surface area for a given mass. The reduced surface by mass continues with each successive cycle of solubilization and precipitation caused by the cycling according to various embodiments of the invention. Phosphorus-based alkalinity is less available for release while PAOs have Less phosphorus available for biological uptake. Overall, the biological and chemical profiles improve the on-Line treatment as the second population of solids is returned to the on-line system. Repeated aeration/non-aeration cycles result in the formation of increasingly larger particles of phosphate-based compounds, beyond the amount that would ordinarily be achieved by just a population of PAOs. Once of sufficient size, these particles can be discarded with the sludge customarily generated by waste treatment processes. However, the sludge volume to be discarded is reduced since this phosphate-based precipitant does not contain the chemical additives used with previous technologies.

Moreover, it is believed that the amount of phosphorus precipitation can be increased by the artificial introduction of carbon dioxide beyond what is achieved through biological respiration. Respiration of the biomass in high-load mixtures produces carbon dioxide that facilitates phosphorus release, and biomass (such as influent or return activated sludge ("RAS") can be added for this purpose. Since such carbon dioxide release is reduced in low-load mixtures, careful controlled exposure of the phosphorus precipitation reaction to an external source of carbon dioxide can allow the phosphorus release rates of low-load mixtures to approach those of high-toad mixtures (see Example 7). Furthermore, even the phosphorus release rates of high-load mixtures can be enhanced by the addition of carbon dioxide. Therefore, for both high- and low-load mixtures, better removal of phosphorus can be achieved with tower overall sludge yield since the process is not limited by a carbon source and natural release of carbon dioxide. Of course, chemical additives can be used in combination with these techniques to further remove solubilized phosphate from treated waste streams.

Principles of the invention can be combined with proprietary (e.g., Example 8) and/or conventional (e.g., Example 9) treatment technologies to achieve synergistic effects. For example, an aeration step is employed in many of the examples provided. Commercially-available online aeration processes such as the ORBAL (trademark of U.S. Filter Corporation, Palm Dessert, Calif.) and Vertical Loop Reactor ("VLR") (trademark of Envirex Inc., Waukesha, Wis.) technologies expose biological processes to an accelerated cycle of high aeration intensity, followed by anoxic conditions. However, in these processes it is acceptable to introduce an external carbon source such as raw influent, seed population, or RAS due to the high oxidation demand environment. Since embodiments of the present invention limit carbon source materials to drive the loss of oxidation pressure, the resulting reaction rates of the invention are much slower due to a reduction in the metabolic rate. Therefore, use of the invention in combination with online, pulsed aeration technology such as the ORBAL or VLR processes allows the invention to be practiced at a much higher throughput rate. Notably, addition of the external carbon source, e.g. contained in the raw influent, drops the main treatment process to anoxic and anaerobic levels precipitously, e.g. in a matter of seconds, compared to much longer periods of time, e.g. hours, in the off-line treatment vessel. In various embodiments, delivery of oxygen may be at a limited number of locations, e.g. two or three points, in the aeration tank that can be 100 feet long. The selection of facultative anaerobes and degrading of the material external to the microbial population is thereby accelerated.

The principles of the invention can also be combined with conventional processes and techniques commonly used in waste treatment plants to achieve synergistic results. For example, seed materials such as those produced in the Examples below can be combined with an external carbon source (such as influent) and held in an anoxic and/or aerated anoxic condition for an extended period of time. This imparts further stress on the biological mixture and can further improve the biological selection and metabolic uptake of carbon. Addition of this material to an upstream portion of the plant (prior to the biological treatment portion of the plant), such as a flow equalization vessel or a wet well that feeds the coarse removal equipment 110, results in subsequent exposure of the mixture to pumping, screening and degritting operations. Thus, exposure of this mixture to these physical and mechanical stresses, and to subsequent cycling of aerobic and anoxic conditions, enhances the treatment while maintaining the low yield characteristics of the second population.

Figure 3:
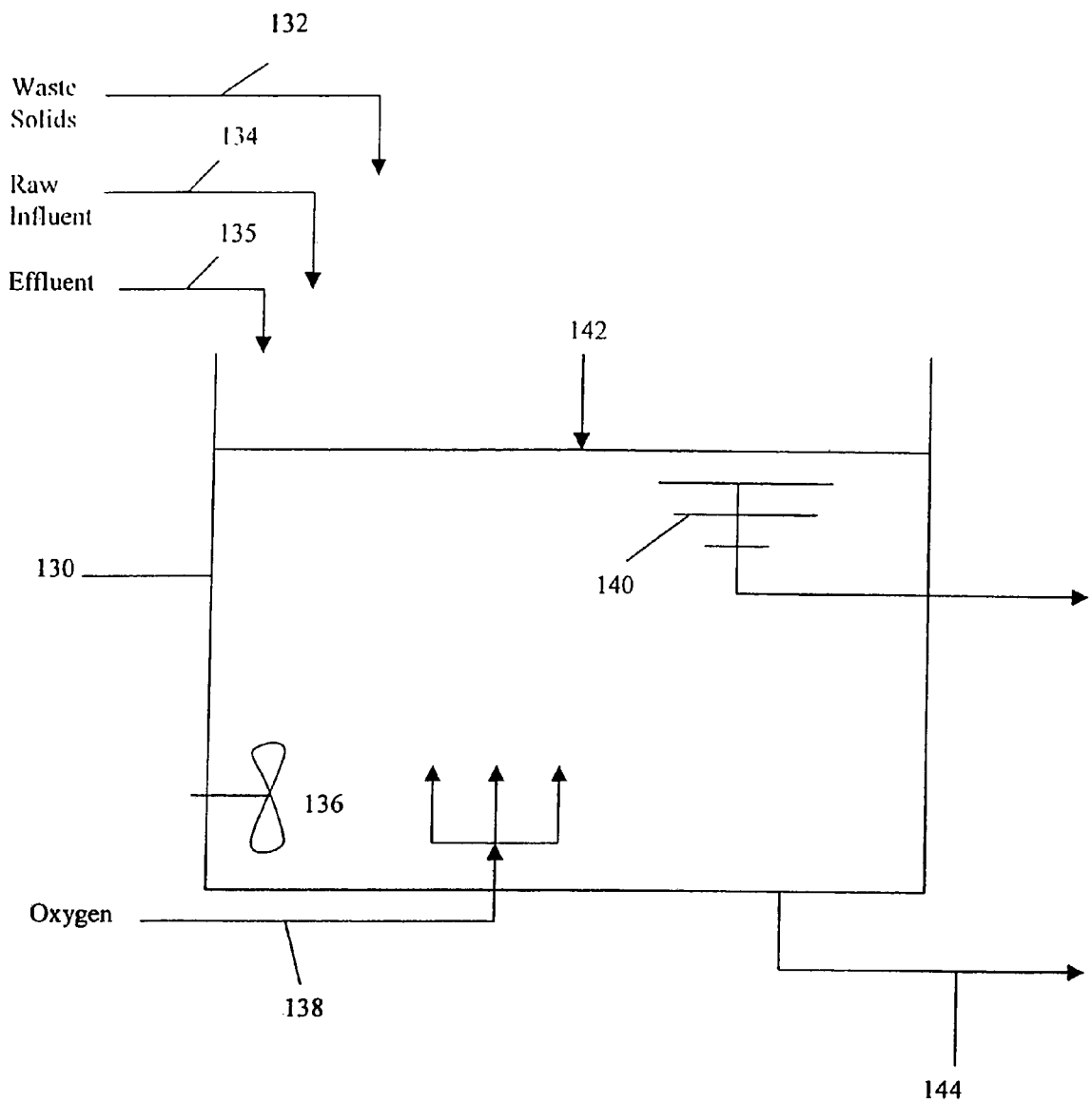
FIG. 3 is a schematic depiction of an apparatus that may be used to implement the present invention.

Many of the methods summarized above may be conveniently implemented by the apparatus illustrated in FIG. 3.

Such an apparatus may be conveniently and inexpensively obtained by making slight modifications to old, perhaps unused waste treatment plant equipment, such as an old digester. The apparatus comprises a vessel, such as a tank 130, a supply of waste solids 132, a supply of raw influent 134, a supply of effluent 135, a mixer 136, a supply of air or oxygen 138 (either or both of these may be used effectively), an upper removal device 140 to remove, at varying elevations, volume such as decant from near the surface 142 of the liquid under treatment, and a lower removal device 144 to remove volume from near the bottom of the tank 130. Upper removal device 140 may consist of, for example, a variable-height overflow weir located at the perimeter of the tank 130, or it could be an internal overflow weir with a variable height adjustment. The height adjustment could be achieved by elevating or lowering the inlet end of the weir, or by having multiple input points at varying elevations and blocking off the input points from which the decant flow is not desired, thereby providing for a controllable decant amount. This blocking can be done by various means, automated or not.

The apparatus of the invention, or other equipment suitable for performing the methods of the invention, can generally be used in either the selector mode or the collector mode of the invention. Such equipment can be used to provide an offline, controlled growing environment in which selected biological materials are isolated, sequentially exposed to or isolated from various environmental factors and stimuli, and controlled to promote desired chemical and biochemical results. In many instances these reactions are forced to equilibria not previously achievable in commercial or municipal online processes, by using batch-mode, offline sequential control processes. Use of such techniques in batch processes isolated from the constraints of the continuous flow processes of a conventional waste treatment plant allows such extreme results to be achieved. Batch operations are distinguishable from continuous flow processes in that during processing there are steps or times during which there is no flow of water or biological materials to or from other processes. Of course, treatment using continuous flow processes can also be performed in the equipment of the invention, but the most favorable results are generally achieved when the time constraints of continuous flow processes are avoided by utilizing batch operations. Isolation from the real time constraints of known treatment processes allows extended residence time to be utilized for certain processing steps as required, and as discussed below.

Specific embodiments of the invention may negate the need for one or more of the above-listed requirements, and they may be implemented in different ways. For example, the mixer may be oriented vertically or horizontally, and supported and/or driven from the top, bottom or the side of the vessel or a pump may be used for mixing internally transferring bulk liquid flows from one location to another within the tank. The supply of air or oxygen 138 may be introduced by different means, from above or below the liquid surface, and different input rates can be used. The apparatus described is effective for performing the steps of the methods detailed below.

In operation, the illustrated apparatus serves as an off-line processing environment facilitating growth of customized biological populations. New influent received from the main treatment process via line 134 is judiciously combined with appropriate excess or waste solids to achieve the necessary growth conditions. Decanted liquid obtained from upper removal device 140 is returned as appropriate to the main treatment process. Material including beneficially derived biological populations are removed via lower removal device 144 and returned to the main treatment process when operating in selector mode, or disposed of when operating in collector mode. The following examples may be practiced using a device as discussed above, and are presented for purposes of illustration and are not intended to limit the application of the invention.

EXAMPLES

Example 1

The following procedure selects for facultative anaerobes, independent of nitrifiers, at the expense of obligate aerobes, to specifically augment biology that rapidly breaks down particulate cBOD into soluble cBOD for utilization.

1. Fill tank 130 with a combination of excess activated sludge and raw influent, providing a nominal suspended solids concentration of between 3,000 and 5,000 mg/liter.
2. Mix contents of tank 130 using mixer 136 without aeration until the ORP is anaerobic, but not so low as to evoke sulfide generation by sulfate reducing bacteria, should there be sulfate present in the raw influent or waste sludge. The mixture can also settle (without mixing) to accelerate the drop in ORP. This mixing and settling should last for about 4 to 8 hours.
3. Stop the mixing and allow the mixture to settle, providing a decantable volume of at least 25% of the volume of tank 130. This will require about 2 to 4 hours.
4. Remove the high cBOD, high ammonia, low ORP ("high load") decant material via the upper removal device 140 to the plant treatment process when desired.
5. Replace the removed volume with raw influent and repeat steps 2 through 4 until the remaining suspended solids content reaches 7,500 to 10,000 mg/liter. This will generally require between 4 and 10 repetitions of these steps.
6. While mixing with mixer 136, return about half of the volume of tank 130 to the plant treatment process.
7. Repeat steps 1 through 6 as necessary.

Example 2

The following procedure selects for facultative anaerobes and aerobes, preserving nitrifiers, at the expense of obligate aerobes, to specifically augment biology low in yield. This is particularly useful for the minimization of residual solids.

1. Fill tank 130 with a combination of excess activated sludge and raw influent, providing a nominal suspended solids concentration of between 5,000 and 7,500 mg/liter.
2. Mix contents of tank 130 using mixer 136 without aeration and/or settle until the ORP is anaerobic, but not so low as to evoke sulfide generation by sulfate reducing bacteria, should there be sulfate in the raw influent or waste sludge. This mixing should last for between 8 hours and 3 days.
3. Continue mixing with mixer 136, and aerate tank 130 "aggressively" until the ORP is >100 mV for 24 hours, >150 mV for 12 hours, or >200 mV for 4 hours.
4. Stop the aeration but continue mixing until the ORP is anaerobic for at least 48 hours. If the ORP does not continue to fall by at least 10 mV per hour, add 3-10% by volume of raw influent.
5. Stop the mixer 136 and allow the contents of tank 130 to settle, to provide a decantable volume of at least 25% of the volume of tank 130. This will take approximately 2 to 4 hours.

6. If a high load return is desired, decant to the treatment process.
7. If a low load return is desired, aerate the mixture and mix using mixer 136 until the ORP is >100 mV for 1 hour. Then stop the mixing and aeration, allow settling and then decant to the treatment process.
8. Replace the decanted volume with excess activated sludge from the supply of waste solids 132, only as along as the solids content remains <7,500 mg/liter. If they are higher then dilute by addition of raw influent.
9. Repeat steps 2 through 6 twice.
10. While mixing with mixer 136, remove ⅓ of the volume of tank 130 to the treatment plant process.
11. Repeat steps 1 through 8 as necessary, taking care to maintain the suspended solids concentration below 10,000 mg/liter, and preferably at less than 8,000 mg/Liter.

Example 3

The following procedure selects for facultative aerobes and nitrifiers to reduce high yield organisms, and improves the nitrification/denitrification capacity. If available, a recycle stream high in ammonia and cBOD content can be used in place of, or in combination with the raw influent, as tong as the cBOD (mg/titer) to $NH_3$—N (mg/titer) ratio is greater than 3. Note that this ratio is referenced to ammonia nitrogen, not Total Kjeldahl Nitrogen (TKN).

1. Fill tank 130 to approximately 75% full with activated sludge at a suspended solids concentration of between 2,500 and 7,500 mg/liter.
2. Mix contents of tank 130 using mixer 136 and with aeration and/or settle until the ORP is aerobic and the ammonia content is <0.1 mg/liter.
3. Stop the aeration.
4. With continued mixing, fill about another 5 to 10% of the volume of tank 130 with additional raw influent. Monitor the ORP and nitrate concentrations until the nitrate concentrations are <0.1 mg/titer. This will take approximately 2 to 4 hours.
5. Continue to mix the tank contents, and begin to aerate tank 130 until the ORP is >100 mV for 4 hours, >150 mV for 2 hours, or >200 mV for 1 hour, and the dissolved oxygen concentration is >3.0 mg/titer for about 1 hour.
6. Stop the mixing and aeration for at least 4 hours, or until the observed dissolved oxygen concentration is <0.2 mg/liter, whichever is longer.
7. Repeat steps 4 through 6 two more times.
8. Remove the top 25% of the volume of tank 130, as decant. If there are suspended solids within this 25%, remove them also.
9. Repeat steps 4 through 8.
10. Restart the mixing, and remove another 25% of the tank volume to the plant treatment process.
11. Replace the volume removed in step 10 with excess activated sludge, maintaining the solids concentration at <7,500 mg/liter. If necessary, add additional raw influent to keep the solids concentration below this level.
12. Repeat steps 2 through 11 as necessary.

Example 4

The following procedure selects for facultative anaerobes and facultative aerobes, to generate a low yield biology population. It disfavors the formation of filamentous biology, such as *Norcardia* sp.

1. Fill tank 130 to at least 90% full with excess activated sludge, providing a nominal suspended solids concentration of between 3,000 and 10,000 mg/liter. Dilute the mixture with raw influent as required to keep the solids content below 10,000 mg/liter. Any dilution required may be done with plant effluent or mixed liquor from the main process flow, but the use of raw influent is preferred.
2. Mix contents of tank 130 using mixer 136 without aeration and/or settle until the ORP is anaerobic, but not so low as to evoke sulfide generation by sulfate reducing bacteria, should there be sulfate present in the raw influent or waste sludge. This mixing could last for between 8 hours and 3 days, depending upon the ambient temperature and the temperature of the mixture. If the ORP stabilizes at over −200 mV, then add 5% by volume of raw influent to the mixture, while mixing with mixer 136.
3. Turn off the mixing and wait for 48 hours, but mix the contents for a one hour period after 24 hours have passed. This needs to be done without aeration.
4. After the 48 hour period, resume mixing with mixer 136 and aerate the contents of tank 130 "aggressively" until the ORP is >100 mV for 16 hours, 150 mV for 8 hours, or >200 mV for 4 hours.
5. Repeat Steps 2 through 4.
6. Stop the mixing and aeration and allow the contents to settle for not more than 2 hours.
7. Remove to the treatment process all of the decantable volume, or 20% of the volume of tank 130, whichever is less.
8. Add raw influent to tank 130 until it is 90% full. If necessary, add excess activated sludge to maintain solids concentration above 5,000 mg/liter.
9. Repeat Steps 2 through 7.
10. While mixing with mixer 136, remove ⅓ of the volume of tank 130 to the plant treatment process.
11. Repeat steps 1 through 10 as necessary, taking care to maintain the suspended solids concentration below 10,000 mg/liter, and preferably at less than 8,000 mg/liter.

Example 5

The following procedure explains how to operate the invention as a collector. Contrasted with the method of Example 2 above, the primary objective of this method is to minimize the disposal volume of any residual solids, rather than to provide a low-yield biology population for return to the waste treatment process.

1. Fill tank 130 with a combination of activated sludge and raw influent, to provide a suspended solids concentration of between 5,000 and 7,500 mg/liter.
2. Mix contents of tank 130 using mixer 136 without aeration and/or settle until the ORP is anaerobic, but not so low as to evoke sulfide generation by sulfate reducing bacteria, should there be sulfate in the raw influent or waste sludge. This mixing could last between 8 hours and 3 days.
3. Start or continue mixing with mixer 136, and aerate tank 130 "aggressively" until the ORP is >100 mV for 24 hours, >150 mV for 12 hours, or >200 mV for 4 hours.
4. Stop the aeration but continue mixing and/or settling until the ORP is anaerobic for at least 24 hours. When the ORP is no longer decreasing by at least 10 mV per hour, proceed to the next step.

5. Stop the mixing and allow the tank contents to settle, providing the maximum decantable volume achievable within 24 hours.
6. If a high load return is desired, then remove the decant to the treatment process.
7. If low load return is desired, then aerate the mixture and mix with mixer 136, and maintain this until the ORP is >100 mV for a period of 1 hour. Then stop the mixing and aeration, allow the mixture to settle to obtain the maximum decant amount available as may be indicated by laboratory settleometer, and then decant the low load material to the treatment process.
8. Replace the decanted volume with activated sludge of the highest available solids content.
9. Repeat steps 2 through 6 until no further decant material is generated upon settling, taking care to not fill the top 5-10% of the volume in tank 130 with solids.
10. In a laboratory settleometer, without substantial aeration, mix for 1 hour a sample consisting 90% of a representative sample of the material contained in tank 130, plus 10% effluent. Allow the mixture to settle for 24 hours. If the volume of settled solids is less than 90% proceed to step 9 for further treatment. Otherwise, remove the contents of tank 130 to the solids disposal process as appropriate.
11. Add effluent to fill tank 130. Mix the contents with mixer 136 for between 1 and 4 hours, taking care to not aerate the mixture.
12. Stop the mixing and allow the tank contents to settle. Decant all available liquid.
13. Repeat steps 8 through 10 until there is no further increase in solids concentration, whereupon the solids mixture is ready for disposal.

Example 6

The following procedure optimizes the facultative anaerobe profile and includes monitoring levels of ORP and pH with ammonia, phosphorus, and nitrate. Nitrate for use in a treatment process can be generated using this method.
1. Proceed through the steps 1-10 of Example 4 such that, using procedures set forth therein, develop an acclimated biomass with a low yield facultative anaerobe population profile in the off-line reactor.
2. Following step 10, add a raw influent to tank 130 until it is about 90% full.
3. Mix contents using mixer 136 without aeration. Mix for 15 minutes after the raw influent is finished being added.
4. Mix daily for no greater than 15 minutes as ORP decreases below −100 mV.
5. Check ammonia and phosphorus release at each daily mixing.
6. As ORP drops below the negative set point less than −200 mV, while tank 130 is mixed, check ammonia and phosphorus concentration.
7. Once ammonia and phosphorus has stabilized between samples with less than about 5 mg/L change, start mixer 136.
8. Once mixer 136 has operated for 30 minutes or longer, start aeration.
9. Continue aeration and mixing until ORP is greater than +50 mV or timed duration for the nitrification cycle reaches a set point. Check ammonia, phosphorus, and nitrate levels. If ammonia is greater than 10 mg/L, continue aeration. If ammonia is less than about 10 mg/L, aeration is optional. Adjust an ORP set point for nitrification cycle. If the ammonia concentration is below 5 mg/L, confine set points, and continue with off cycle. Check nitrate level.
10. If aeration continues past step 9 and if pH decreases more than 0.2 s.u., stop aeration. Check ammonia, phosphorus, and nitrate levels with operating set points of pH, ORP, and time duration.
11. While mixer 136 is still operating, return no more than a third of the tank volume to the on-line process.
12. Add excess activated sludge to tank 130 until it is 90% full, and repeat steps 3 through 11. When necessary, add new influent to maintain solids concentration below 10,000 mg/L or to accelerate the decrease in ORP.

Example 7

The following procedure can be utilized to create phosphate particles of increasing size. Use of this technique in a treatment process allows environmental discharge standards for effluent phosphorus control to be met while maintaining a low sludge yield profile and reducing the amount of chemical addition for phosphorus precipitation.
1. Proceed through the steps of Example 6.
2. Continue to extend off-cycle times if phosphorus release continues between sampling (greater than 5 mg/L per sample time).
3. Check ORP negative step point with phosphorus release. Once phosphorus release is stable or sulfate reduction is excessive, based on odor generation at mixing and aeration, move to step 4.
4. Turn on mixer 136 for no greater than about 15 minutes, turn on aeration cycle until pH level indicates a 0.2 S.U. decrease.
5. While mixer 136 is still operating, return no more than ¼ of the tank volume to the on-line treatment process.
6. Add excess activated sludge to tank 130 until it is 90% full, and repeat steps 2 through 5. When necessary, add new influent to maintain solids concentration below 10,000 mg/L or to accelerate the decrease in ORP.

Example 8

The following procedure uses accelerated cycles of high aeration intensity to degrade biological material external to the microbial population. This technique can be used to enhance the results of Example 2
1. Proceed through the steps of Example 2 with modified control procedure as set forth in Example 6.
2. Couple off-stream reactor with the on-line pulsed aeration process found in oxidation ditches and vertical loop reactors.
3. Ensure the off-Line tank contents are returned to the on-line process by mixing directly with the raw influent prior to the on-line treatment process.

Example 9

The following procedure generates a process seed having an increased carbon uptake capacity. The resulting seed mixture can be added to a treatment process to facilitate the treatment of a waste stream.
1. Proceed through the steps of Example 6 to maximize the facultative anaerobic profile with high nitrate discharge.
2. Return seed to the Biological Phosphorus Removal zone of the on-line process. The on-line process of anaerobic and anoxic zones provides for high carbon uptake with a seed population that has been optimized for high carbon uptake.

By the above it can be seen that a highly useful apparatus and methods have been developed for improving the efficiency and effectiveness of waste treatment plant operations, both in terms of improving their existing treatment processes, and for minimizing the amount of waste disposal volumes to be managed. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of treating a waste stream, the method comprising the steps of:
   a. conducting at least a portion of the waste stream to a first treatment vessel for treatment comprising contact with a first biological population having a first population profile;
   b. drawing off a portion of the waste stream to an off-line treatment vessel comprising a unitary uncompartmented tank; and
   c. controlling the drawn-off portion of the waste stream in the off-line treatment vessel so as to establish, in the drawn-off portion, a second biological population having a second population profile different from the first population profile by sequentially subjecting the entire drawn-off portion within the unitary uncompartmented tank to aerobic conditions followed by anaerobic or anoxic conditions, wherein during the controlling step, there is no flow from the off-line treatment vessel to the first treatment vessel, wherein the step of sequentially subjecting the drawn-off portion to aerobic and anaerobic or anoxic conditions comprises (i) at least one accelerated cycle of achieving a predetermined aeration intensity level followed by reducing oxygen levels to anaerobic or anoxic conditions, and (ii) an extension of at least one accelerated cycle in the waste stream in the first treatment vessel.

2. The method of claim 1 wherein the predetermined aeration intensity level is determined based on the size of an input area for conducting oxygen into the waste stream in the first treatment vessel.

3. The method of claim 1 wherein oxygen levels are reduced by providing an external carbon source to drive loss of oxidation pressure in the first treatment vessel.

4. The method of claim 3 wherein the external carbon source is selected from the group consisting of: raw influent, an unstable mixed liquor generated in the first treatment vessel, and methanol.

5. The method of claim 1 wherein the anoxic conditions are characterized by an ORP level in the drawn-off portion of about 50 mV or Less.

6. The method of claim 1 wherein the controlling step comprises a controlled addition of a further portion of the waste stream into the off-line treatment vessel.

7. The method of claim 1 wherein the controlling step includes allowing settling to produce a decantable volume having a reduced volume and mass of solids.

8. The method of claim 7 wherein the decantable volume comprises a population having a reduced content of biology.

9. The method of claim 1 wherein subjecting the drawn-off portion to aerobic conditions comprises pulsed aeration.

10. The method of claim 1, wherein the predetermined aeration intensity level comprises an aerobic intensity level sufficient to provide a dissolved oxygen level above about 1 mg/L for a selected period of time.

11. A method of treating a waste stream, the method comprising the steps of:
    a. conducting at least a portion of the waste stream to a first treatment vessel for treatment comprising contact with a first biological population having a first population profile;
    b. drawing off a portion of the waste stream to an off-line treatment vessel; and
    c. controlling the drawn-off portion of the waste stream in the off-line treatment vessel so as to establish, in the drawn-off portion, a second biological population having a second population profile different from the first population profile by sequentially subjecting the drawn-off portion to aerobic conditions followed by anaerobic or anoxic conditions, wherein (i) during the controlling step, there is no flow from the off-line treatment vessel to the first treatment vessel, and (ii) the step of sequentially subjecting the drawn-off portion to aerobic and anaerobic or anoxic conditions comprises at least one accelerated cycle of achieving a high aeration intensity level followed by reducing oxygen levels to anaerobic or anoxic conditions, wherein the high aeration intensity level comprises an aerobic intensity level sufficient to provide at least one of an ORP greater than 100 mV for 24 hours, an ORP greater than 150 mV for 12 hours, or an ORP greater than 200 mV for 4 hours.

* * * * *